(12) United States Patent
Kim et al.

(10) Patent No.: US 6,512,627 B1
(45) Date of Patent: Jan. 28, 2003

(54) FIBER-OPTIC FREQUENCY SHIFTER, OPTICAL INTERFEROMETER AND METHOD OF GENERATING TWO COMPLEMENTARY OPTICAL INTERFERENCE SIGNALS USING THE SAME

(75) Inventors: Byoung Yoon Kim, Taejon (KR); Wang Joo Lee, Taejon (KR); Bong Kyu Kim, Seoul (KR)

(73) Assignees: Korea Advanced Institute of Science and Technology (KR); Donam Systems Inc. (KR)

( * ) Notice: Subject to any disclaimer, the term of this patent is extended or adjusted under 35 U.S.C. 154(b) by 0 days.

(21) Appl. No.: 09/424,967

(22) PCT Filed: Mar. 30, 1999

(86) PCT No.: PCT/KR99/00153

§ 371 (c)(1),
(2), (4) Date: Nov. 30, 1999

(87) PCT Pub. No.: WO99/50628

PCT Pub. Date: Oct. 7, 1999

(30) Foreign Application Priority Data

Mar. 30, 1998 (KR) ............................................. 98-11059

(51) Int. Cl.[7] .......................... G02F 1/365; G02B 6/26; G01B 9/02
(52) U.S. Cl. ........................ 359/332; 356/477; 356/491; 385/15; 385/27
(58) Field of Search .................................. 359/326–332, 359/483–489, 494–500; 385/11, 15, 27, 28, 39, 123; 356/477, 491–495

(56) References Cited

U.S. PATENT DOCUMENTS

| 4,915,468 A | 4/1990 | Kim | .................. 350/96.15 |
|---|---|---|---|
| 5,173,743 A | 12/1992 | Kim | .......................... 356/345 |
| 5,619,325 A | * 4/1997 | Yoshida | ...................... 356/491 |

FOREIGN PATENT DOCUMENTS

EP    0 523 921 A1    1/1993

OTHER PUBLICATIONS

Engan et al, "Propagation and Optical Interaction of Guided Acoustic Waves in Two–Mode Optical Fibers", Journal of Lightwave Technology, vol. 6, No. 3, pp. 428–436, Mar. 1988.*

(List continued on next page.)

*Primary Examiner*—John D. Lee
(74) *Attorney, Agent, or Firm*—Marger Johnson & McCollom, P.C.

(57) ABSTRACT

This invention relates to optical devices such as a fiber-optic frequency shifter and an optical interferometer. This invention also relates to a method of generating optical interference signals to obtain reliable sensor signals independent of polarization fluctuations of the optical waves in the fiber. Fiber-optic interferometers have many advantages such as high sensitivity and convenient way of using even in poor surrounding environments. These interferometer, however, exhibit polarization dependent signal degradation since the polarization of a light wave passing through an optical fiber irregularly changes depending on the birefringence of the fiber. This invention is characterized in that the frequencies of two orthogonal eigen polarizations of a light wave are shifted to different frequency values at one optical path of the interferometer. They produce two beat interference signals after interfering with the light wave passed through the other optical paht of the interferometer. The two beat interference signals have amplitudes varying complementarily. Selecting the larger one from the two beat signals can prevent polarization dependent signal degradation. Moreover, the beat signals from the optical interferometer according to the invention requires simpler signal processing compared to the output of conventional fiber-optic interferometer.

5 Claims, 7 Drawing Sheets

OTHER PUBLICATIONS

Berwick et al, "Demonstration of Birefringent Optical Fibre Frequency Shifter Employing Torsional Acoustic Waves", Electronics Letters, vol. 27, No. 9, pp. 713–715, Apr. 25, 1991.*

A Fiber Optic Frequency Shifter Renliang Xu, Brian Schmitz, and Martin Lynch Particle Characterization, Coulter Corporation P.O. Box 169015, Miami, Florida 33116 *Rev. Sci. Instrum.* 68(5),. May 1997 pp. 1952–1961.

* cited by examiner

FIBER-OPTIC FREQUENCY SHIFTER, OPTICAL INTERFEROMETER AND METHOD OF GENERATING TWO COMPLEMENTARY OPTICAL INTERFERENCE SIGNALS USING THE SAME

TECHNICAL FIELD

This invention relates to optical devices, more particularly to a fiber-optic dual frequency shifter and a fiber-optic interferometer.

This invention also relates to a method of generating optical interference signals in which reliable sensor signals are obtained independent of polarization states of the optical waves in optical fibers.

BACKGROUND ART

Fiber-optic interferometric sensors obtain sensor signals by interfering two light waves that passed through an interferometer on different optical paths. In general, two light waves that passed through the fiber-optic interferometer on different optical paths experience different polarization change because of the birefringence which is intrinsic or induced by external influences such as fiber-bendings. One of the problems involved in the operation of fiber-optic interferometric sensors is therefore that the intensity of the interference signal is non-uniform and varies in time. For example, the intensity of the interference signal is extremely low for signal processing or completely disappears when the polarization states of the interfering optical waves are mutually orthogonal.

To solve this problem, prior arts employ the following methods of controlling the polarization state.

Method Using a Squeezer

If a side of an optical fiber is squeezed, refractive indices in the direction of squeezing pressure and in its normal direction will change to have different values. Adjusting fiber birefringence by this squeezing method can make the intensity of interference signals high enough because it induces appropriate polarization change in the light waves passing through the fiber.

FIG. 1 is a schematic cross-sectional view of a polarization controller using a squeezer. Referring to FIG. 1, two parallel plates 20 contacting the side of an optical fiber 10 squeezes the fiber 10. The pressure applied to the fiber 10 forms a fast axis and a slow axis therein since refractive indices in the direction of squeezing pressure and in its normal direction become different. The squeezer 5 comprises the two parallel plates 20 and means for pressuring (not shown). A series of three squeezers, the squeezing directions of which are twisted by 45 degrees between adjacent ones, can produce optimum polarization state by adjusting the respective squeezing pressures.

This method can be used in a study of small laboratory level. However, it is not adequate for automatic application, and causes the complexity of system configuration when applied to sensor arrays using only one common optical detector since a series of three squeezers should be equipped with one sensor.

Method Using a Loop-type Polarization Controller

The loop-type polarization controller uses the birefringence induced in an optical fiber when the fiber is bent in a loop shape. Radial direction of the loop and direction normal to the loop plane become birefringence axes. Appropriately adjusting the radius of a loop can make the loop a quarter-wave plate.

FIG. 2 schematically shows the configuration of a loop-type polarization controller 25.

Referring to FIG. 2, two loops are arranged in series and each loop can be rotated in T-direction along the axis of the linear fiber portion. If the angle between two loop planes is optimally adjusted, maximum interference can be realized.

This method provides more convenient way of controlling polarization compared to the method using a squeezer. However, it is also inadequate for automatic and sensor array applications.

Method Using Input Polarization Scanning

When optical waves passed through two different fiber optical paths interfere with each other, the interference visibility depends upon the polarization state of input light as well as the birefringence of the fiber. In this method, three different polarization states, all of which can not cause the interference signals to disappear simultaneously are input one by one with time in pulse mode, and then the output signals are separated by a detector to produce a maximum signal. In principle, the three polarization states satisfying this condition can be represented by three points on the Poincare Sphere, where the lines from the center of the Sphere to the three points are mutually perpendicular.

This method is adequate for automatic and sensor array applications, however, has the complexity of signal processing since one maximum signal should be selected from the comparison of three signals.

There are other methods using such as polarization masking or polarization switching besides the above-described methods. However, these methods also have problems of complex signal processing and noise generation.

DISCLOSURE OF THE INVENTION

The object of the present invention is to introduce a novel device called fiberoptic dual frequency shifter and to provide two complementary interferometric signals so that they do not suffer polarization-induced signal fading simultaneously by using this device in fiber-optic interferometers. Generally, any polarization state in the fiber is a linear sum of the two orthogonal eigen polarization states of the fiber. In the case of usual fiber-optic frequency shifter, the optical frequencies of the two eigen polarization states are frequency shifted to the same amounts. But according to the present invention, the two eigen polarization components are differently frequency shifted. The dual fiberoptic frequency shifter may be made of an elliptic core optical fiber or a polarization maintaining optical fiber.

The present invention also provides a fiber-optic interferometer adapting the dual frequency shifter in one of the two optical paths. This configuration produces two beat interference signals of different frequencies whose amplitudes are always complementary. Due to polarization fluctuation, the amplitudes vary with time but they are never faded simultaneously and the larger signal is selected and used for sensing the measurand.

BRIEF DESCRIPTION OF THE DRAWINGS

The detailed description particularly refers to the accompanying drawings in which.

BEST MODE FOR CARRYING OUT THE INVENTION

Figure 1:
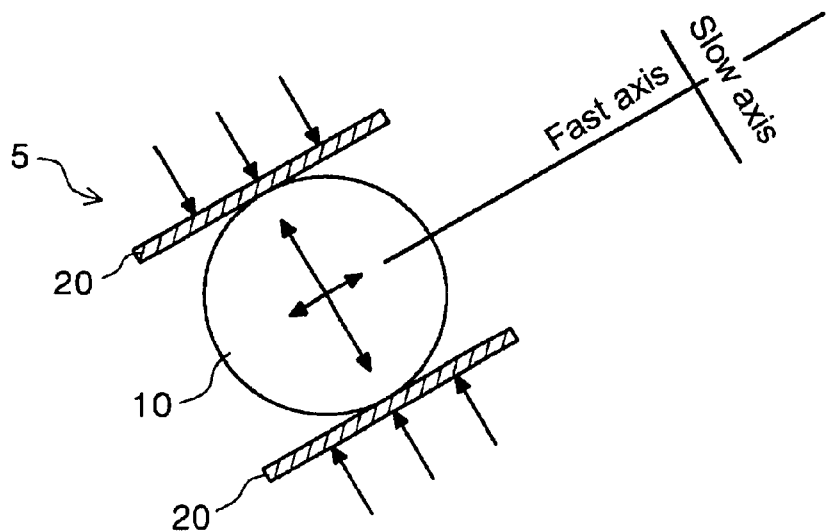
FIG. 1 is a schematic cross-sectional view of a polarization controller using a squeezer.
Figure 2:
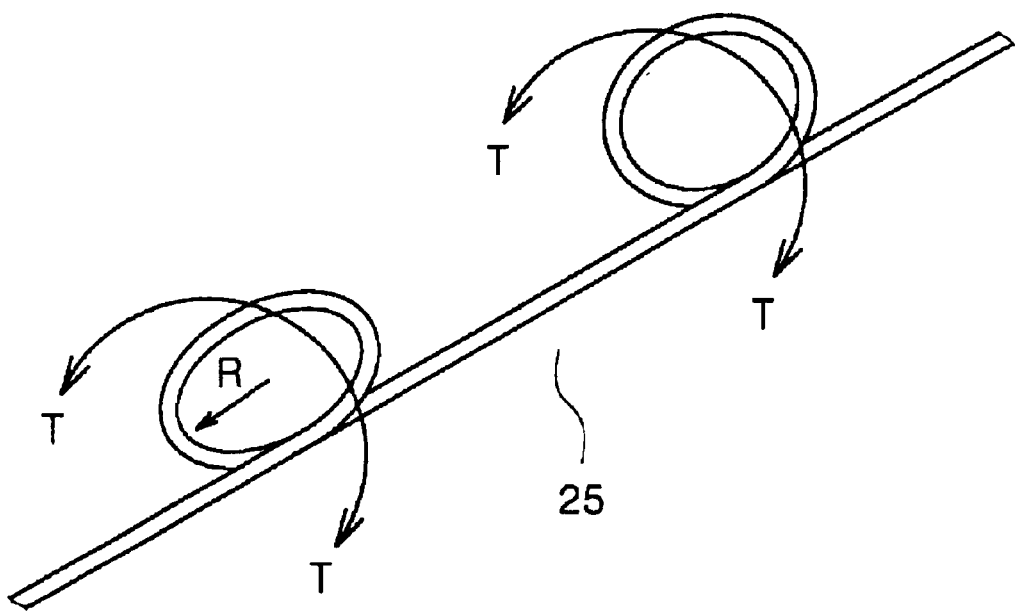
FIG. 2 schematically shows the configuration of a loop-type polarization controller.
Figure 3:
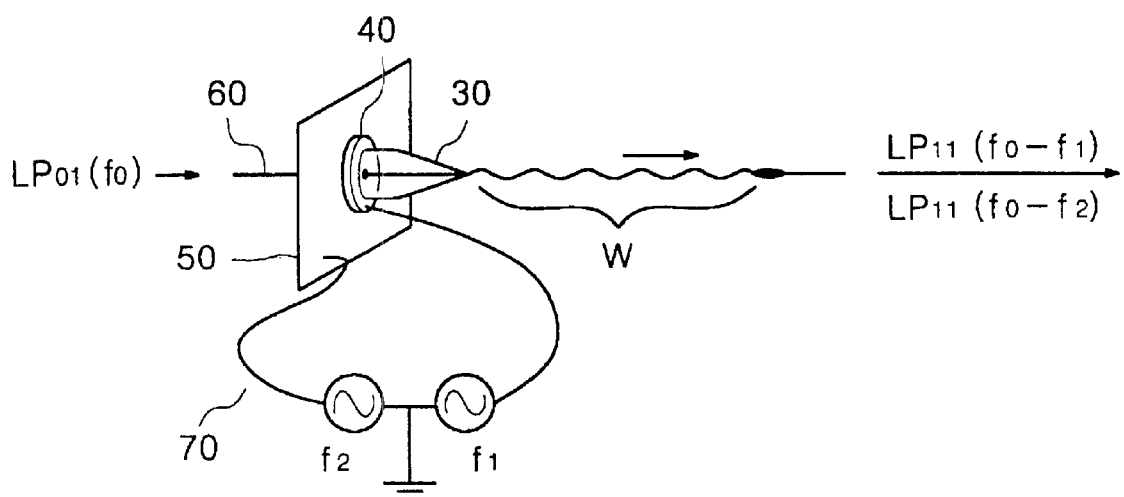
FIG. 3 schematically shows the configuration of the fiber-optic dual frequency shifter according to the present invention.

FIG. 3 schematically shows the configuration of a fiber-optic dual frequency shifter according to the present invention. Referring to FIG. 3, a glass horn 30, a flat cylindrical PZT(Piezo-electric Transducer) device 40 and a metal support 50, all of which have their respective through-holes, are joined together in series. One side of the PZT device 40 is attached to the flat side of glass horn 30 and the other side of PZT device 40 to the metal support 50 by a conducting adhesive. The through-holes are connected together, and a length of jacket-stripped elliptical core two mode optical fiber 60 passes through the through-holes. The through-hole in the glass horn 30 passes through the tip of glass horn 30 and the optical fiber 60 is attached to the tip of glass horn 30. A polarization maintaining two mode optical fiber may be used instead of the fiber 60. Input optical wave is launched to the fiber 60 in the LP01 mode with equal intensities of the two eigen polarizations of the fiber. AC voltages with different frequencies $f_1$ and $f_2$ are applied to the PZT device 40 by two AC voltage sources 70. Mechanical vibrations are generated in the PZT device 40 by the AC voltages and transferred to the fiber 60 after being amplified at the tip of glass horn 30, producing two microbend waves of frequencies $f_1$ and $f_2$. These microbend waves propagate along the fiber 60. Mode conversion from the input LP01 mode to the LP11 modes takes place when the wavelength of the microbend wave coincides with the intermodal beat length. Also the input optical frequency is shifted as much as the frequency of the microbend wave at the same time. In case of using an elliptical core fiber or a polarization maintaining fiber, the intermodal beat lengths for the two eigen polarizations differ a little, which means that the two eigen polarizations can be frequency shifted differently by applying two corresponding AC voltages.

Figure 4:
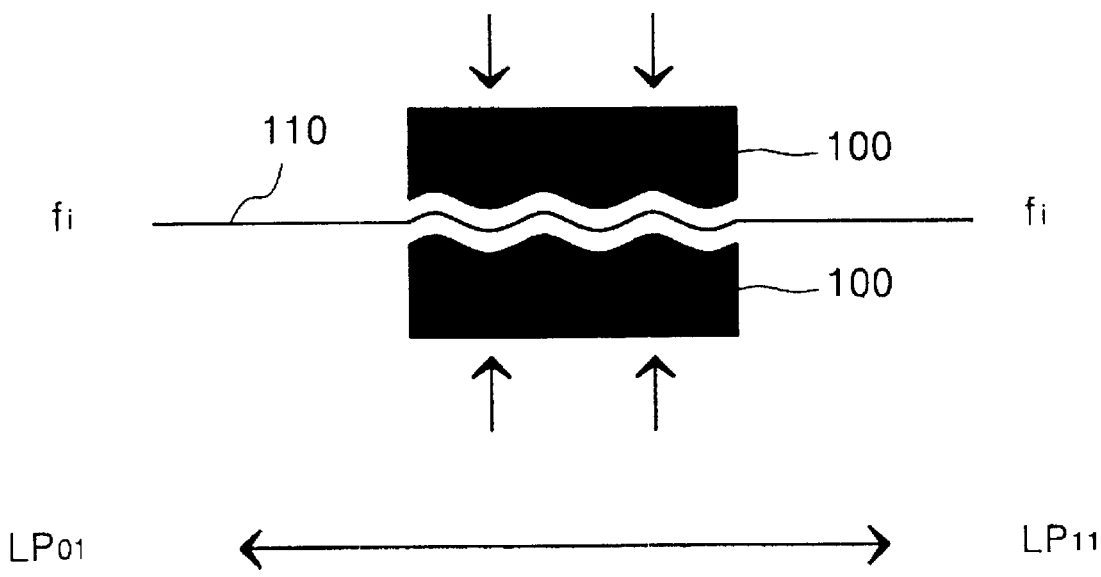
FIG. 4 shows a mode converter that is used together with the fiber-optic dual frequency shifter of FIG. 3.

FIG. 4 shows a mode converter that is used in an optical interferometer of the present invention. The mode converter is used next to the fiber-optic dual frequency shifter of FIG. 3. Since all part of the interferometer except the frequency shifter and the mode converter is composed of single mode fiber, mode reconversion to LP01 mode is necessary for lossless transmission through the remainig fiber. The mode converter therefore converts the LP11 mode into LP01 mode. Referring to FIG. 4, a microbend deformer 100 with periodic teeth thereon introduces closely spaced microbends in an optical fiber 110. When the period of the microbends coincides with the beat length between the LP01 and LP11 modes, mode conversion takes place again. But unlike the microbends generated in the above-described frequency shifter, these stationary microbends can not change the optical frequency. Also the number of microbends is very small compared to that of the frequency shifter, mode converter is unable to distinguish the difference of the beat leangths of the two eigen polarization. Then much broader mode conversion is possible. Therefore, if the two eigen polarizations having differently shifted frequencies, as was described in FIG. 3, enter the mode converter, the shifted frequencies of the polarizations are maintained in spite of mode conversions of both the eigen polarizations.

Figure 5:
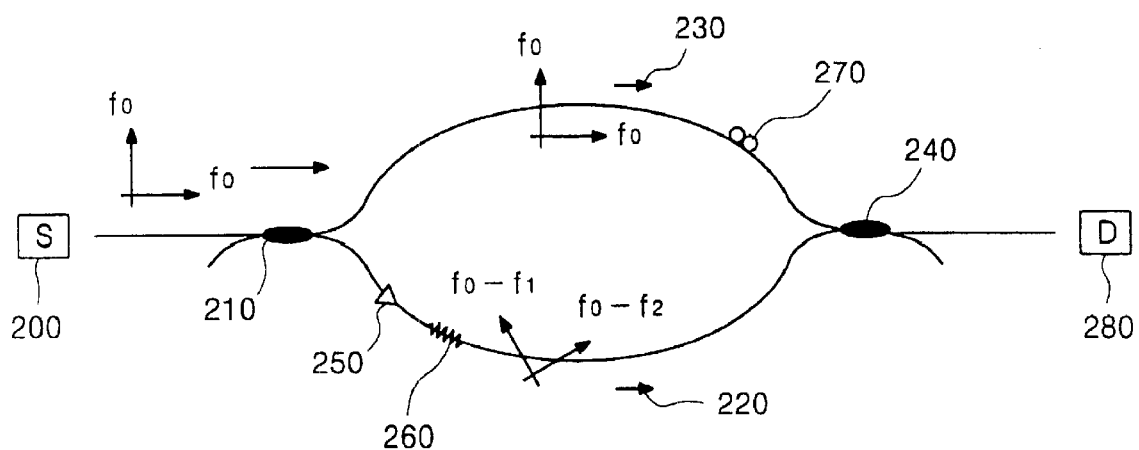
FIG. 5 shows one of a simple configuration of a fiber-optic Mach-Zehnder interferometer according to the present invention.

FIG. 5 shows the configuration of a fiber-optic Mach-Zehnder interferometer according to the present invention. Referring to FIG. 5, a polarized optical wave from a light source 200 is divided by a first directional coupler 210 into two paths, and then the divided waves propagate through first and second optical paths 220 and 230, respectively. After the respective waves experience different changes in both polarization and phase, they are recombined at a second directional coupler 240. One of the divided waves propagating along the first optical path 220 passes through a dual frequency shifter 250 and a mode converter 260 described in FIG. 4. At the second optical path 230, a loop-type polarization controller 270, which is not a necessary element for the optical interferometer of the present invention, is installed in order to verify the proper operation of the optical interferometer under polarization fluctuation. An optical detector for detecting interference signals is provided next to the second directional coupler 240. A single frequency shifter (not shown) can be added to the second optical path 230 for enhanced signal processing.

In the following the operation of the fiber-optic Mach-Zehnder interferometer is described.

At first, a linearly polarized light of frequency $f_0$ is emitted from the light source 200 and then propagates along an optical fiber with a fundamental LP01 mode. The light enters the elliptic core optical fiber of the dual frequency shifter 250 with equal intensities of the two eigen polarizations. This can be done by using a polarization maintainning fiber between the input port and the frequency shifter or by using an another polarization controller before the frequency shifter. The first method is preferred in real case. When the two eigen polarizations propagate through the frequency shifter 250 and mode converter 260, an AC electrical signal with two specific frequencies ($f_1$ and $f_2$) is applied to the PZT device 40 described in FIG. 3 to frequency shift the input frequency $f_0$–$f_1$ and $f_0$–$f_2$ respectively. Then the frequencies of the two polarizations become $f_0$–$f_1$ and $f_0$–$f_2$. The light waves are guided through a single mode fiber in two orthogonal polarization states, and then combined with the light wave of frequency $f_0$ traveled through the second optical path 230 to produce two beat notes of frequencies of $f_1$ and $f_2$. The main feature of the optical interferometer is that the frequencies of light waves propagating through the first optical path 220 are changed by using the fiber-optic dual frequency shifter while the two orthogonal eigen polarizations experience different frequency shifts. That is, one eigen polarization experiences a frequency shift of $f_1$ and the other eigen polarization a frequency shift of $f_2$ from the original optical frequency, respectively. The frequency shifted polarizations also experience arbitrary polarization changes while passing through next optical fibers, however, mutually orthogonal polarization states are maintained. Therefore, two beat interference signals $I_1$ and $I_2$ can be written as $I_1 = C_1(t) \sin\{2\pi f_1 t + \Delta\Phi(t)\}$ $I_2 = C_2(t) \sin\{2\pi f_2 t + \Delta\Phi(t) + \Theta\}$ where $\Delta\Phi(t)$ is the phase difference induced by the measurand and $\Theta$ is the phase difference between the two frequency shifted eigen polarization states induced by the birefringence of the fiber. In most cases especially when the interferometer is used for acoustic sensing the frequency spectrums of the $\Delta\Phi$ and $\Theta$ are well separated and $\Theta$ can be easily removed during demodulation process. So $I_1$ and $I_2$ have practically the same information about the measurand. The amplitudes of the two output signals can become extremely smaller due to polarization changes of the interfering optical waves but since $C_1^2 + C_2^2$ is constant in time the two beat signals do not become larger or smaller simultaneously. That is, one becomes large while the other becomes small. Therefore, a sufficiently good interference signal can be always obtained between the two outputs by selecting the larger one of the two beat signals. This is possible by two electronic band pass filters centered at $f_1$ and $f_2$. Also conventional optical interferometers produce non-linear output for the phase difference between two optical paths, which makes it difficult to obtain information on original phase difference by a simple signal processing circuit. For the frequency shift type of optical interferometer according to the invention, however, the phase different information detected by the interferometer can be easily obtained by using conventional method of phase demodulation of a carrier.

Figure 6:
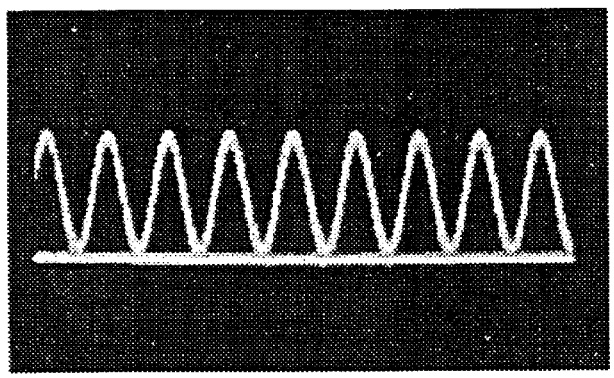
FIG. 6 shows beat interference signals at the output port of optical interferometer of FIG. 5 in case that the input optical wave has only one eigen polarzation of the dual frequency shifter.

FIG. 6 shows a beat interference signal at the output port of optical interferometer of FIG. 5 where only one eigen polarization is launched to the frequency shifter to show the shape of $I_1$ or $I_2$ clearly. In this case, the input polarization state to the frequency shifter is parallel with one of the birefringence axes of the fiber, which shifts the frequency of input light for only one frequency.

Figure 7:
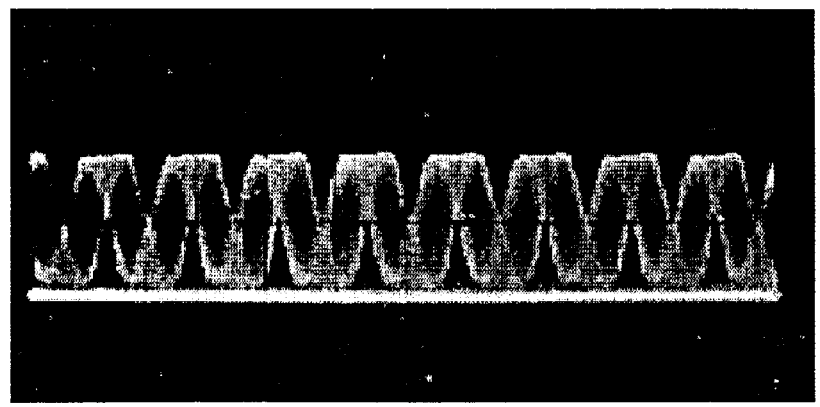
FIG. 7 shows an observed phase modulated beat interference signal in the same condition of FIG. 6 and the phase of the optical wave passing through the upper arm of the interferometer is modulated by a phase modulator which is not shown in FIG. 5.

FIG. 7 shows a phase modulated beat interference signal observed when the frequency of input polarization is shifted under the same conditions of FIG. 6 and at the same time the phase of the light wave passing through the other arm of the interferometer is modulated by a sinusoidal function of frequency 10 kHz with amplitude pi radians. Referring to FIG. 7, it is demonstrated that the phase of the beat interference signal is modulated according to the phase modulation occurring at the other arm of the interferometer. That is, the beat interference signal acts as a carrier wave.

Figure 8:
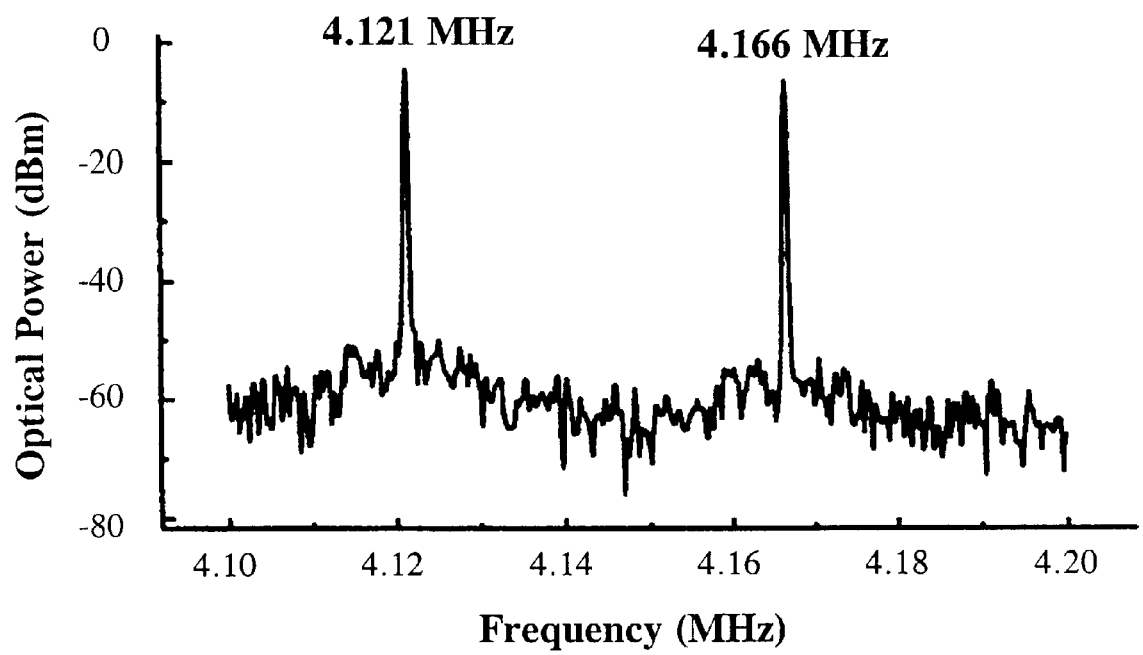
FIG. 8 shows two beat interference signals when the input optical wave has two eigen polarizations of the dual frequency shifter. They are differently frequency shifted for two eigen polarisations.

If a light wave enters the first optical path so as to generate two eigen polarizations, the frequencies of the polarizations are differently shifted to produce two beat interference signals. The two beat interference signals are detected by an optical detector and then observed using a radio-frequency spectrum analyzer. The result is shown in FIG. 8. Referring to FIG. 8, two peaks at the frequencies of 4.121 MHz and 4.166 MHz are attributed to the two beat interference signals, respectively. From the measured frequencies of the two beat notes, it was demonstrated that the frequency of the beat signal is equal to the driving frequency of the PZT device.

Figure 9A:
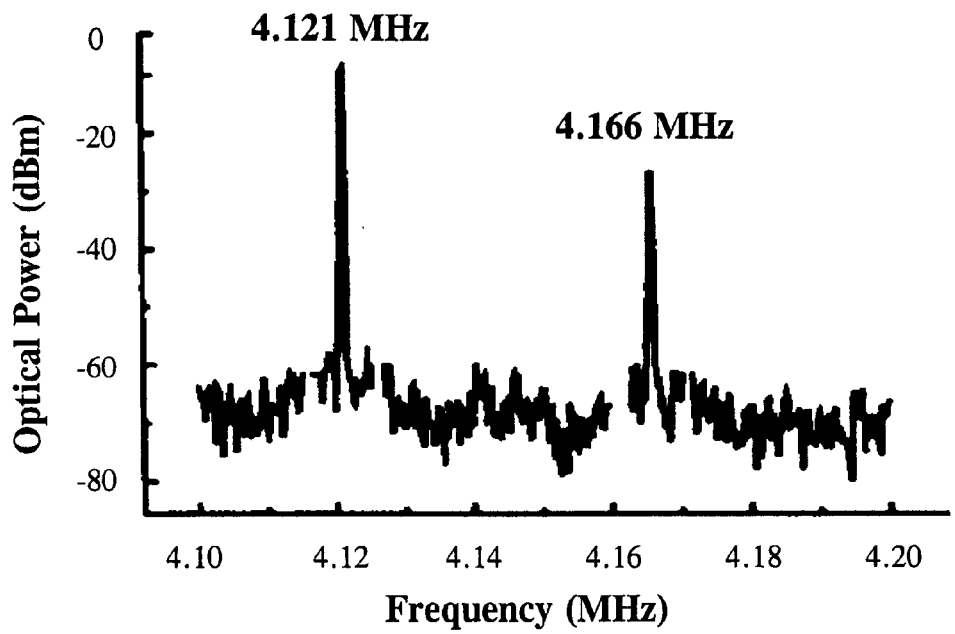
FIGS. 9A and 9B show, respectively, the amplitudes of the two beat interference signals under polarization change of a optical wave passing through the upper path.
Figure 9B:
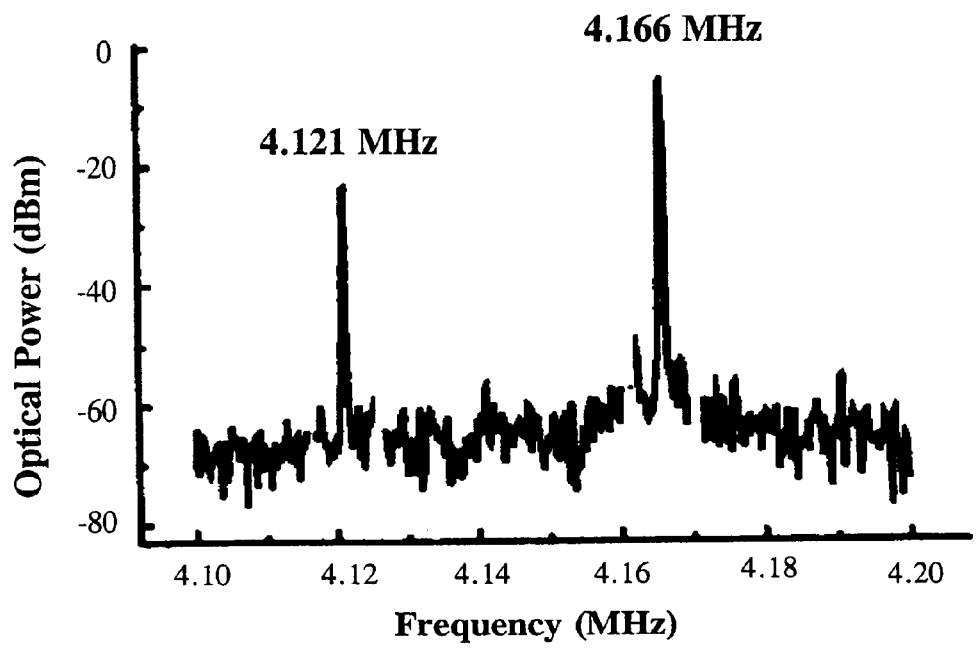

FIGS. 9A and 9B show, respectively, two beat interference signals observed while the polarization of a light wave passing through the second optical path is controlled by the loop-type polarization controller of FIG. 5, under the same conditions of FIG. 8. Referring to FIGS. 9A and 9B, the amplitudes of the two beat interference signals vary satisfying complementary relations with the polarization change.

Figure 10A:
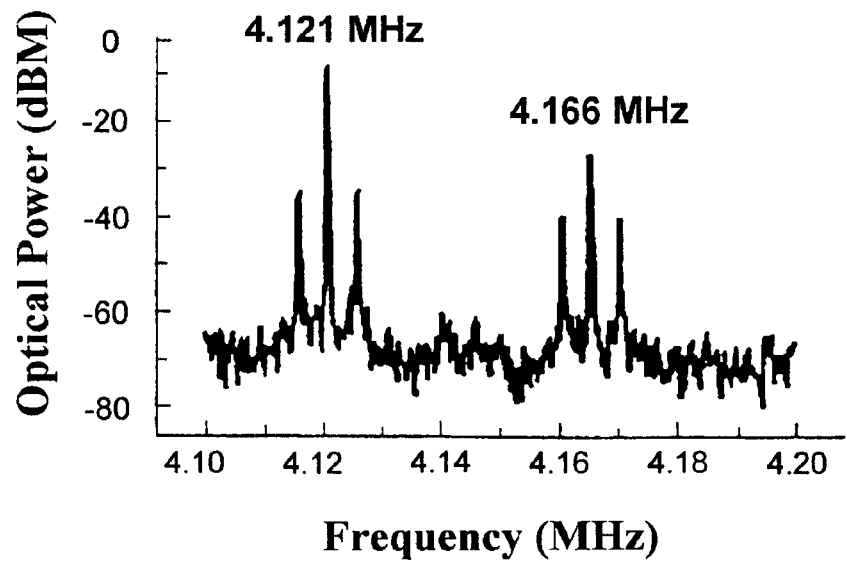
FIGS. 10A and 10B are graphs for showing the effect of phase modulation on the beat interference sign.
Figure 10B:
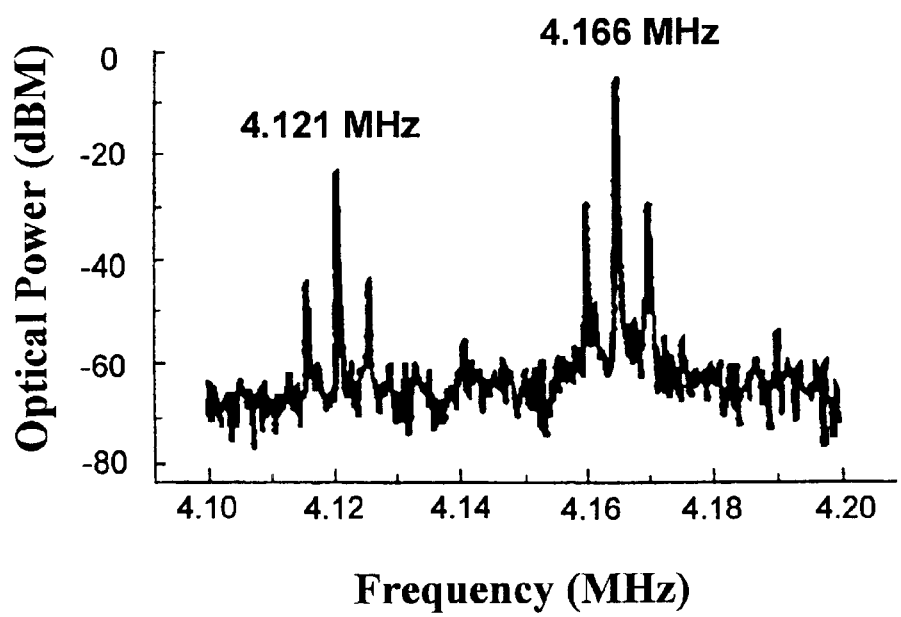

FIGS. 10A and 10B show, respectively, two beat interference signals observed when the frequencies of input polarizations are shifted under the same conditions of FIGS. 9A and 9B and at the same time phase-modulation of frequency 5 kHz is applied to the light wave passing through the other arm of the interferometer. These signals are also detected by an optical detector and then observed using a radio-frequency spectrum analyzer. Referring to FIGS. 10A and 10B, the phase modulation signals are indicated by the side bands of beat signals.

Figure 11:
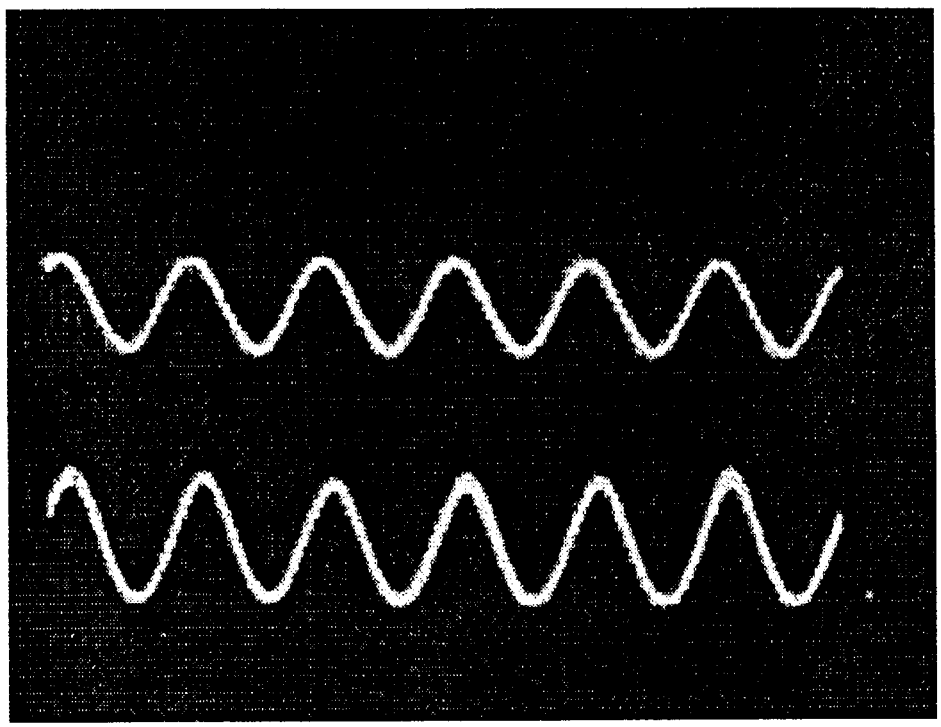
FIG. 11 shows an example of signal processed output according to the invention.

To evaluate the applicability of this optical interferometer under random polarization fluctuation, the larger beat note was automatically selected by a comparater circuit and demodulated by a phase locked loop(PLL) circuit during random polarization control and applying phase modulation signal of frequency 600 Hz in the second optical path. The result is shown in FIG. 11. The phase modulation signal is indicated by "A" and the demodulated signal for "A" is indicated by "B". The amplitude of "B" was varied only slightly. Referring to FIG. 11, it is understood that a reliable sensor signal can be obtained independent of arbitrary polarization change by selecting and signal processing the larger one from the two beat interference signals.

What is claimed is:

1. A fiber optic interferometer, comprising:

two optical paths for propagating divided light waves on different paths;

a fiber optic frequency shifter used in one of the optical paths to shift the frequencies of two eigen polarizations of a light wave propagating therein, the absolute value of frequency shifts being different from each other and both resulting frequencies are also different from the frequency of said light wave; and a single fiber optic frequency shifter used in the other of the optical paths.

2. A method of generating beat interference signals, comprising:

preparing a fiber optic interferometer having two optical paths;

introducing divided light waves to the two optical paths, respectively;

shifting the frequencies of two eigen polarizations of the light wave propagating through one of the optical paths, the absolute value of frequency shifts being different from each other and both resulting frequencies are also different from the frequency of the light wave propagating through the other of the optical paths;

combining the light waves passed through the two optical paths to produce two beat signals which can be separated by two electronic bandpass filters, the amplitudes of the signals being complementary depending on the polarization states of the interfering light waves; and using a single fiber-optic frequency shifter to shift the frequency of the light wave propagating through the other of the optical paths.

3. A fiber-optic frequency shifter, comprising:

a two-mode birefringent fiber for propagating an input light wave therein; and means for shifting the frequencies of two eigen polarizations of the input light wave within the optical fiber, wherein the absolute value of the shifted frequencies are different from each other and both resulting frequencies are either larger than the frequency of the input light wave or both resulting frequencies are smaller than the frequency of the input light wave, and also the frequency shifting process is characterized by associated mode conversion between LP01 mode and LP11 mode.

4. The fiber-optic frequency shifter of claim 3, wherein the means for shifting the frequencies includes:

a piezoelectric transducer (PZT) driven by two AC voltages of different frequencies; and means for transferring mechanical vibrations generated in the transducer to the optical fiber to thereby produce two flexural microbend waves of different frequencies on the fiber.

5. The fiber-optic frequency shifter of claim 4, furter including a rigid horn having a through-hole at a tip through which the optical fiber passes, and a flat side attached to the PZT.

* * * * *

UNITED STATES PATENT AND TRADEMARK OFFICE
CERTIFICATE OF CORRECTION

PATENT NO.    : 6,512,627 B1
DATED         : January 28, 2003
INVENTOR(S)   : Kim et al.

It is certified that error appears in the above-identified patent and that said Letters Patent is hereby corrected as shown below:

<u>Title page,</u>
Item [57], ABSTRACT,
Line 17, "optical paht" should read -- optical path --.

<u>Column 2,</u>
Line 45, "fiberoptic" should read -- fiber-optic --.

<u>Column 3,</u>
Line 15, "FIG. 5." should read -- FIG 5; --.
Line 19, "polarisations;" should read -- polarizations; --.

<u>Column 8,</u>
Line 7, "furter including" should read -- further including --.

Signed and Sealed this

Thirteenth Day of January, 2004

JON W. DUDAS
*Acting Director of the United States Patent and Trademark Office*